(12) United States Patent
Pandey

(10) Patent No.: US 12,519,681 B2
(45) Date of Patent: Jan. 6, 2026

(54) APPARATUS AND METHOD FOR REDUCTION OF COMMON MODE SIGNAL IN WIRED DATA COMMUNICATION LINK

(71) Applicant: HUAWEI TECHNOLOGIES CO., LTD., Shenzhen (CN)

(72) Inventor: Sujan Pandey, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/799,699

(22) Filed: Aug. 9, 2024

(65) Prior Publication Data
US 2024/0406042 A1 Dec. 5, 2024

Related U.S. Application Data

(63) Continuation of application No. PCT/EP2022/053388, filed on Feb. 11, 2022.

(51) Int. Cl.
*H04L 25/00* (2006.01)
*H04L 25/03* (2006.01)
*H04L 25/08* (2006.01)

(52) U.S. Cl.
CPC ...... *H04L 25/085* (2013.01); *H04L 25/03834* (2013.01)

(58) Field of Classification Search
CPC ............... H04L 25/0282; H04L 25/085; H04L 25/0276; H04L 25/03834
See application file for complete search history.

(56) References Cited

U.S. PATENT DOCUMENTS

| 6,424,630 | B1 * | 7/2002 | Ang | H04L 25/06 370/251 |
| 8,144,807 | B2 * | 3/2012 | Mirfakhraei | H04B 3/32 375/299 |
| 9,859,928 | B1 * | 1/2018 | Bauer | H04B 1/123 |

* cited by examiner

*Primary Examiner* — Dac V Ha
(74) *Attorney, Agent, or Firm* — Leydig, Voit & Mayer, Ltd.

(57) ABSTRACT

An apparatus for reduction of transmitter originated common mode signal in a wired data communication link includes a digital front-end configured to generate a differential transmit signal based on transmit data, and pulse-shape the differential transmit signal by a pulse-shaping filter to obtain a pulse-shaped differential transmit signal. The digital front-end includes a compensation filter configured to filter the differential transmit signal in order to reduce a common mode signal distortion. The apparatus further includes an analog front-end configured to convert the pulse-shaped differential transmit signal into an analog signal for transmission over the wired data communication link, a common mode signal detector configured to detect the common mode signal in the analog signal, and a filter coefficient determiner configured to determine filter coefficients of the compensation filter based on the detected common mode signal for common mode signal reduction and provide the filter coefficients to the compensation filter.

15 Claims, 9 Drawing Sheets

APPARATUS AND METHOD FOR REDUCTION OF COMMON MODE SIGNAL IN WIRED DATA COMMUNICATION LINK

CROSS-REFERENCE TO RELATED APPLICATIONS

This application is a continuation of International Application No. PCT/EP2022/053388, filed on Feb. 11, 2022, the disclosure of which is hereby incorporated by reference in its entirety.

FIELD

Embodiments of the present disclosure relate to an apparatus and a method for transmitter originated common mode signal in a wired data communication link where the common mode signal forms a source of electromagnetic radiation. In particular, embodiments of the present disclosure relate to techniques for adaptive digital-to-analog conversion (DAC) parameters tuning for electromagnetic emission (EME) mitigation, such as for usage in automotive, industrial and consumer electronics environments.

BACKGROUND

Wired based high speed serial communication physical interfaces (PHYs) 110, 120 exchange data over a cable 130, e.g., a twisted pair cable as illustrated in FIG. 1. No matter how good the twisted pair cable is in terms of coupling attenuation, PHY itself will generate a common mode signal due to inherent process related mismatches within the transmitter front-end blocks. This can ultimately cause a violation in electromagnetic emission depending on the strength of the common mode signal. FIG. 1 illustrates the phenomena of emission, where a long cable 130 acts as an antenna. If there is any presence of a common mode signal, it will be radiated through the cable. Typically, the mismatch within the transmitter front-end is minimized by calibration, which can be done one time or repeated on-the-fly during the operation of the device. The one-time calibration is simple but may not be optimal if the process changes over time. While on-the-fly mismatch calibration among blocks is optimal, it brings disadvantages with respect to design effort and complexity resulting in high cost and time-to-market. Intensive calibration for mismatches among the blocks can reach to close to zero mismatches however, given the complexity of design, the calibration techniques can be complex resulting in silicon area overhead. Use of common mode filter to attenuate the common mode signal introduces an off-chip component and adds bill-of-materials cost for the system design.

SUMMARY

Embodiments of the present disclosure provide a solution for reduction of common mode signal in wired data communication in order to overcome the above-described problems.

In particular, embodiments of the present disclosure provide a concept for detecting and canceling out or at least reducing this transmitter originated common mode signal without significantly increasing the PHY complexity and power consumption.

According to embodiments of the present disclosure, the concept is not to calibrate the blocks that have mismatches, it rather uses a filter that compensates for the common mode signal while still living with the inherent mismatch among the blocks. This added value eventually saves front-end design complexity for calibration so there is no need to over-specify the blocks for close to zero mismatch.

Embodiments of the present disclosure provide common mode signal compensation through detecting and adaptively filtering this common mode signal.

Following advantages can be realized by using this common mode signal compensation:

A solution can be found that reduces the transmitter originated common mode signal, which ultimately acts as radiation source. There is no need for a complex, time consuming, and costly in-built calibration technique for block mismatch. The common mode signal emission pattern can be learned over time and can be cancelled through adding an anti-magnitude and phase signal in the signal path. The solution is cost effective and suitable for time to market.

The solution can be described by the following: Detecting the common mode signal in time domain at the front-end across the termination resistor; Finding the correlation between the detected common mode signal and signal from one branch of the front-end driver; Based on the correlation results, one of the signal paths is compensated for the detected common mode signal at the output resistor. This can be done either by a separate filter or a filter glue with existing filter within the signal path at the transmitter front-end.

The concept according to embodiments of the present disclosure can be applied in automotive applications using wired-based data communication links, e.g., Ethernet cables such as defined by 1000BASE-T1, 10GBASE-T1, and future 25GBASE-T1. As there is a need of more and more bandwidth for the future autonomous vehicle to reliably transmit sensors data to the central processing unit, techniques according to the disclosure can be advantageously applied to improve efficiency of data transmission.

Apart from automotive, the technology described herein can also be applied in industrial and automation applications as well as consumer electronics.

In order to describe the disclosure in detail, the following terms, abbreviations and notations will be used:
PHY physical layer device or physical interface
EEE Energy Efficient Ethernet
FEC Forward Error Correction
OAM Operation, Administration, and Management
MAC Medium Access Control
PCS Physical Coding Sublayer
PMA Physical Medium Attachment
MII Medium Independent Interface
DAC Digital to Analog converter According to a first aspect, the disclosure relates to an apparatus for reduction of transmitter originated common mode signal in a wired data communication link where common mode signal forming a source of electromagnetic radiation, the apparatus comprising: a digital front-end configured to generate a differential transmit signal based on transmit data, the digital front-end being further configured to pulse-shape the differential transmit signal by a pulse-shaping filter to obtain a pulse-shaped differential transmit signal, wherein the digital front-end comprises a compensation filter configured to filter the differential transmit signal in order to reduce a common mode signal distortion; an analog front-end configured to convert the pulse-shaped differential transmit signal into an analog signal representing the pulse-shaped differential transmit signal for transmission over the wired data communication link; a common mode signal detector configured to detect a common mode signal in the analog signal; and a filter coefficient determiner configured to determine filter coefficients of the compensation filter based on the detected common mode signal for common mode signal reduction, and to provide the filter coefficients to the compensation filter.

Such apparatus can advantageously detect and cancel out or at least reduce the transmitter originated common mode signal without significantly increasing the PHY complexity and power consumption.

In particular, this apparatus can relax the transmit analog front-end DAC specification resulting in a cost-effective solution. There is no need for bill of materials for suppression of emission. There is no need of re-spinning the design for EME fix. Instead, EME issues can be fixed on the fly. Only a small on-chip computation logic may be required which insignificantly adds silicon area and power.

In an exemplary implementation of the apparatus, the determined filter coefficients are adaptive filter coefficients for adjusting the compensation filter, the filter coefficient determiner being configured to determine the filter coefficients based on a least squares scheme for minimizing the detected common mode signal.

This provides the advantage that the adaptive filter coefficients can easily adapt to changing environments, e.g., changes in the wired data communication link.

In an exemplary implementation of the apparatus, the filter coefficient determiner comprises a signal correlator configured to correlate the detected common mode signal with the analog signal to obtain a correlated common mode signal and to determine the filter coefficients based on the correlated common mode signal.

This provides the advantage that by using the correlated common mode signal, the common mode signal can be better detected, since the correlation provides a higher signal level over a noise signal.

In an exemplary implementation of the apparatus, the digital front-end comprises a first branch configured to process a first signal component of the differential transmit signal and a second branch configured to process a second signal component of the differential transmit signal, wherein the first signal component and the second signal component of the differential transmit signal are configured as signals of equal magnitude and opposite polarity.

This provides the advantage that the common mode signal components can be separately processed by using either the first branch or the second branch.

In an exemplary implementation of the apparatus, the compensation filter is arranged: in the first branch of the digital front-end; or in the second branch of the digital front-end. In an alternative, it can be arranged in both branches.

This provides the advantage of flexibility. The compensation can be performed in each signal branch or in both of them.

In an exemplary implementation of the apparatus, the pulse-shaping filter is arranged in both, the first branch and the second branch of the digital front-end.

This provides the advantage that the same pulse-shaping is applied to both signal components of the common mode signal resulting in a symmetrical shaping. Thus, compensation in one branch is sufficient which reduces complexity of the apparatus.

In an exemplary implementation of the apparatus, the compensation filter and the pulse shaping filter which are arranged in the first branch of the digital front-end are separate filter circuits or a common filter circuit; and the compensation filter and the pulse shaping filter which are arranged in the second branch of the digital front-end are separate filter circuits or a common filter circuit.

This provides the advantage of flexibility. The compensation and pulse-shaping can be separately implemented or implemented by a common filter circuit. For the common filter solution, a hardware complexity may be slightly smaller than for the separate filter solution.

In an exemplary implementation of the apparatus, the pulse shaping filter comprises fixed filter coefficients and the compensation filter comprises adaptive filter coefficients, wherein the common filter circuit comprises a glue logic configured to adjust at least part of the common filter circuit based on a combination of a fixed filter coefficient with an adaptive filter coefficient.

This provides the advantage that the fixed filter coefficients can be used during start-up and the adaptive filter coefficients can adapt the compensation filter to changing environments, e.g., changing the cable in the field or even variations in the hardware design over different production lines.

In an exemplary implementation of the apparatus, the analog front-end comprises a first branch configured to process a first signal component of the pulse-shaped differential transmit signal and a second branch configured to process a second signal component of the pulse-shaped differential transmit signal, wherein the first signal component and the second signal component of the pulse-shaped differential transmit signal are configured as signals of equal magnitude and opposite polarity.

This design of the apparatus provides the advantage that a common mode signal can be efficiently mitigated, and low or moderate precision DACs can be used instead of high precision DACs.

In an exemplary implementation of the apparatus, the analog front-end comprises: a first digital-to-analog converter and a first line driver which are configured to determine a first signal component of the analog signal; and a second digital-to-analog converter and a second line driver which are configured to determine a second signal component of the analog signal.

This provides the advantage that the common mode signal can be efficiently detected in the analog domain by the analog front-end and efficiently compensated in the digital domain by the digital front-end.

In an exemplary implementation of the apparatus, the common mode signal detector is configured to detect the common mode signal based on the first signal component of the analog signal and the second signal component of the analog signal.

This provides the advantage that a low-complexity common mode signal detection can be applied, e.g., by determining the half-sum of these signal components: $V_{cm}=(V1+V2)/2$, where $V_{cm}$ is the common mode signal and $V1$ and $V2$ are the two signal components in units of Volt.

In an exemplary implementation of the apparatus, the filter coefficient determiner is configured to determine the filter coefficients of the compensation filter based on a correlation of the detected common mode signal with the following: the first signal component of the analog signal; or the second signal component of the analog signal.

This provides the advantage that by using the correlated common mode signal, the filter coefficients of the compensation filter can be determined with higher precision resulting in a lower common mode signal distortion and hence lower electromagnetic radiation.

In an exemplary implementation of the apparatus, for a compensation filter arranged in the first branch of the digital front-end, the filter coefficients of the compensation filter are determined based on a correlation of the detected common mode signal with the first signal component of the analog signal; and for a compensation filter arranged in the second branch of the digital front-end, the filter coefficients of the compensation filter are determined based on a correlation of the detected common mode signal with the second signal component of the analog signal.

This provides the advantage that only a single compensation filter is required which reduces component costs.

In an exemplary implementation of the apparatus, the compensation filter comprises a finite impulse response filter.

This provides the advantage that processing FIR filters can be done by using standard filtering procedures, e.g., based on standard software libraries. Design cost can be reduced.

According to a second aspect, the disclosure relates to a method for reduction of transmitter originated common mode signal in a wired data communication link where common mode signal forming a source of electromagnetic radiation, the method comprising: generating a differential transmit signal based on transmit data; pulse-shaping the differential transmit signal by a pulse-shaping filter to obtain a pulse-shaped differential transmit signal; converting the pulse-shaped differential transmit signal into an analog signal representing the pulse-shaped differential transmit signal for transmission over the wired data communication link; filtering the differential transmit signal by a compensation filter in order to reduce a common mode signal distortion; detecting a common mode signal in the analog signal; determining filter coefficients of the compensation filter based on the detected common mode signal for common mode signal reduction; and providing the filter coefficients to the compensation filter.

Such a method provides the same advantages as the apparatus described above with respect to the first aspect. I.e., the method can advantageously detect and cancel out or at least reduce the transmitter originated common mode signal without significantly increasing the PHY complexity and power consumption.

According to a third aspect, the disclosure relates to a computer program product including computer executable code or computer executable instructions that, when executed, causes at least one computer to execute the method according to the second aspect.

Such a computer program product may include a non-transient readable storage medium storing program code thereon for use by a processor, the program code comprising instructions for performing the method or the computing blocks as described hereinafter.

The computer program product may run on a computer, e.g., a processor or a controller of a communication system using the wired-base data communication link 130 shown in FIG. 1.

Using such a computer program product improves efficiency of data transmission by reducing common mode signal and hence electromagnetic radiation.

BRIEF DESCRIPTION OF THE DRAWINGS

Further embodiments of the disclosure will be described with respect to the following figures, in which.

DETAILED DESCRIPTION

In the following detailed description, reference is made to the accompanying drawings, which form a part thereof, and in which is shown by way of illustration specific aspects in which embodiments of the present disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The devices and methods described herein may be configured to transmit and/or receive data over wired-based serial data communication link, for example according to IEEE 802.3 for wired Ethernet. The original Ethernet uses coaxial cable as a shared medium, while the newer Ethernet variants use twisted pair and fiber optics links in conjunction with switches. The Ethernet standards comprise several wiring and signaling variants of the OSI physical layer (PHY) in use with Ethernet.

In this disclosure, common mode signals are described. A common mode signal may be described as the voltage common to both input terminals of an electrical device. The common-mode signal on a transmission line is also known as longitudinal voltage. In most electrical circuits the signal is transferred by a differential voltage between two conductors. If the voltages on these conductors are V1 and V2, the common-mode signal Vcm is the half-sum of these voltages: Vcm=(V1+V2)/2. When referenced to the local common or ground, a common-mode signal appears on both lines of a two-wire cable, in phase and with equal amplitudes. Technically, a common-mode voltage can be specified as one-half the vector sum of the voltages from each conductor of a balanced circuit to local ground or common.

Figure 1:
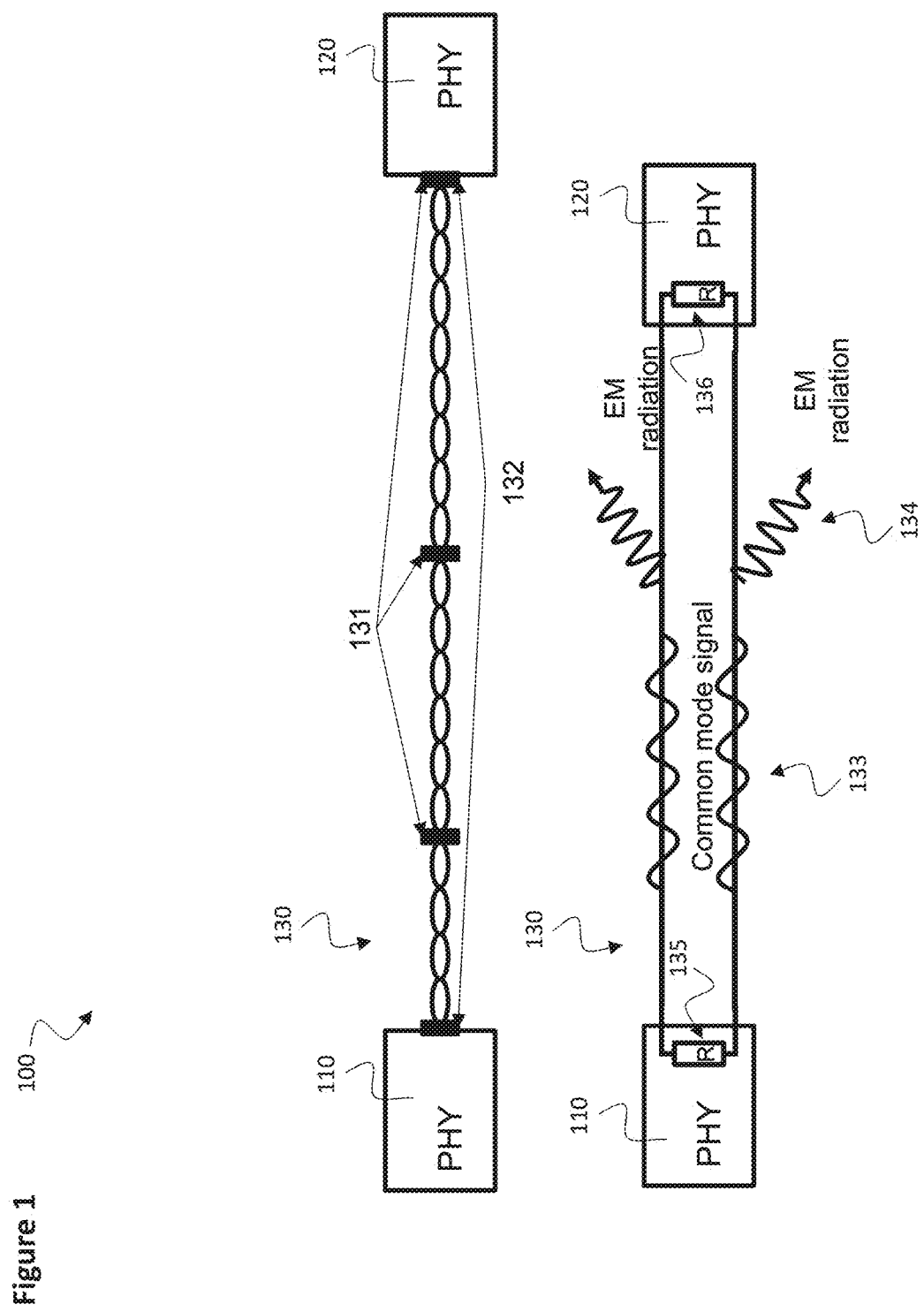
FIG. 1 shows a schematic diagram illustrating a wired data communication link 130 where transmitter originated common mode signal 133 is forming a source of electromagnetic radiation 134 according to some embodiments.

FIG. 1 shows a schematic diagram illustrating a wired data communication link 130 where transmitter originated common mode signal 133 is forming a source of electromagnetic radiation 134. Two wired based high-speed serial communication PHYs 110, 120 exchange data over a wired-based data communication link 130. The length of the cable 130 may vary from a fraction of a meter up to about 100 meters or even longer. The cable 130 has one or more MDI connectors 131 for increasing the cable length. A line impedance 131 at the left-hand side of the cable 130, i.e., for PHY 110 may be 100 Ohms, for example. A line impedance 132 at the right-hand side of the cable 130, i.e., for PHY 120 may be 100 Ohms, for example. Each PHY 110, 120 may transmit and/or receive data. In this environment, the long cable 130 acts as an antenna which radiates a common mode signal 133 through the cable 130 generating electromagnetic (EM) radiation 134.

In one example, the wired data communication link 130 may comprise a shielded twisted pair cable.

In one example, the wired data communication link 130 may comprises an Ethernet cable, in particular an automotive Ethernet cable.

Ethernet is a family of wired computer networking technologies commonly used in local area networks (LAN), metropolitan area networks (MAN) and wide area networks (WAN). It was first standardized in 1983 as IEEE 802.3. Ethernet has since been refined to support higher bit rates, a greater number of nodes, and longer link distances, but retains much backward compatibility.

The apparatus described in this disclosure is able to cancel or at least reduce transmitter originated common mode signal coupled into all kinds of Ethernet cables described above.

Figure 2:
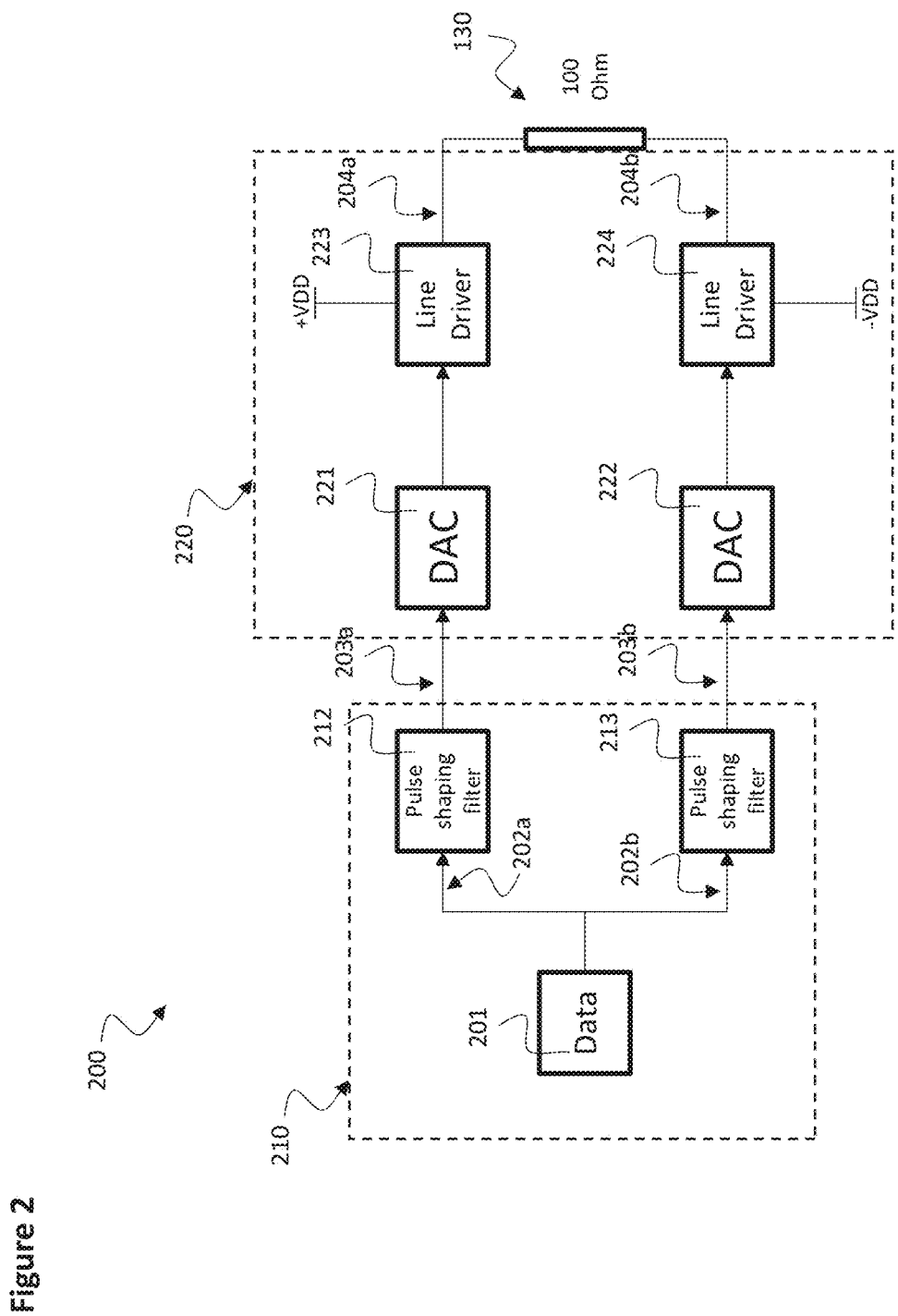
FIG. 2 shows a block diagram of a transmitter 200 generating electromagnetic emission (EME) due to mismatches on the front-end, according to some embodiments.

FIG. 2 shows a block diagram of a transmitter 200 generating electromagnetic emission (EME) due to mismatches on the front-end.

A set of blocks is shown that are used in the transmitter front-end for differential signaling wired communication. These blocks include a data block 201 for providing data for transmission over the data communication link 130, that is schematically illustrated by an impedance 130 of an exemplary value of 100 Ohms. These blocks are partitioned in a first signal path 202a, 203a, 204a or signal component that are related to positive supply voltage +VDD; and a second signal path 202b, 203b, 204b or signal component that are related to negative supply voltage −VDD.

The transmitter can be partitioned in a digital front-end 210 or digital processing part 210 and an analog front-end 220 or analog processing part 220. The digital front-end 210 includes a first pulse shaping filter 212 in the first signal path 202a and a second pulse shaping filter 213 in the second signal path 202b. The analog front-end 220 includes a first digital-to-analog converter (DAC) 221 and a first line driver 223 in the first signal path 203a and a second DAC 222 and a second line driver 224 in the second signal path 203b. The first line driver 223 is supplied by the positive supply voltage +VDD and the second line driver 224 is supplied by the negative supply voltage −VDD. Both line drivers 223, 224 are coupled to the wired data communication link 130 for transmitting the analog signal 204a, 204b output by the line drivers 223, 224 over the wired data communication link 130.

The blocks that are connected with +VDD are exactly symmetrical in amplitude but opposite in phase with blocks that are connected with −VDD. In sub-nano meter silicon technology, there will always be some mismatch between these blocks and the mismatch issue can be fixed to some extend using extensive in-built calibration technique. This needs to over specify the design and that means more effort in terms of cost and time.

Figure 3:
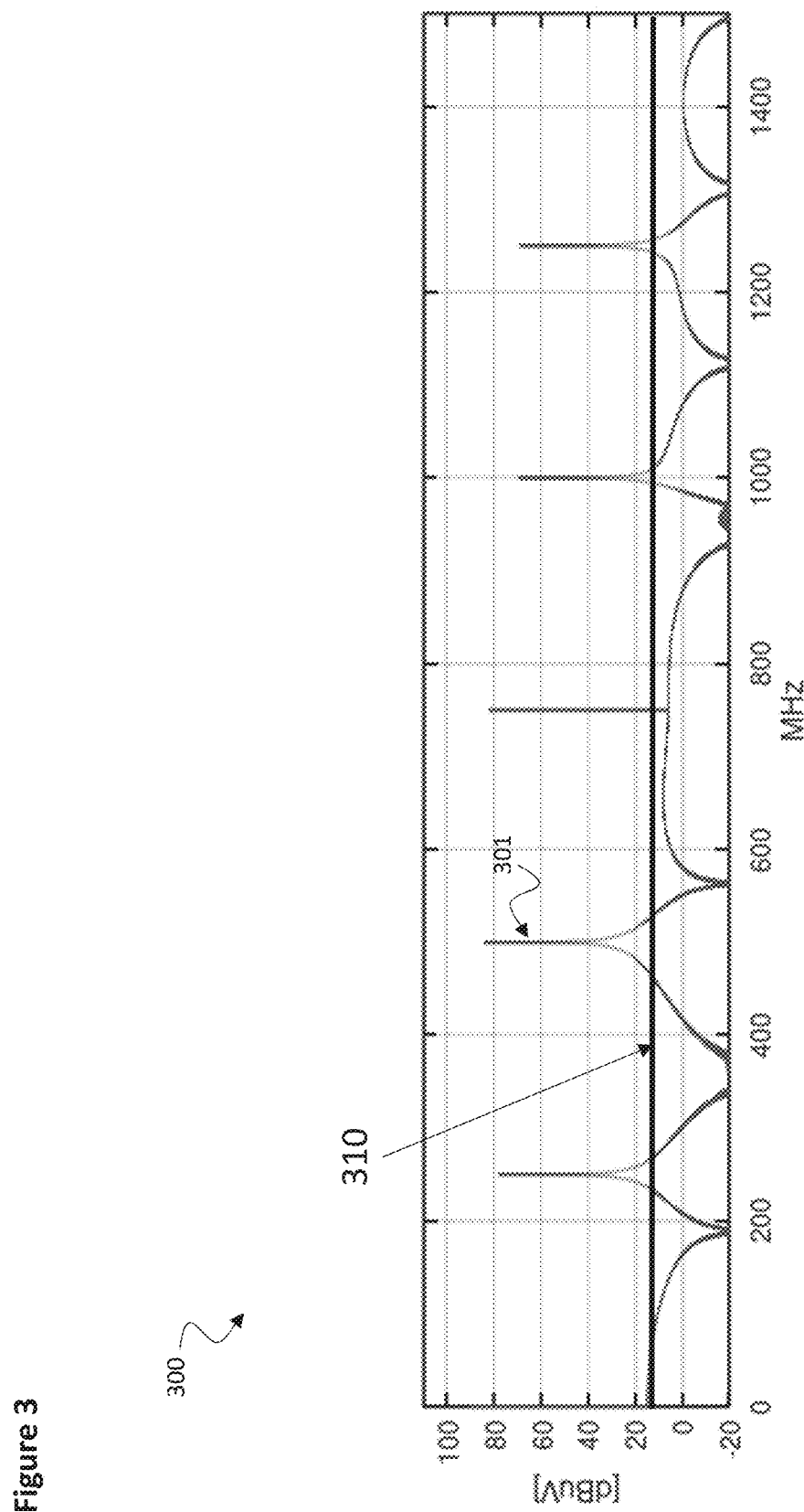
FIG. 3 shows a performance diagram 300 illustrating exemplary emissions 301 from a transmitter front end and an emission limit line 310 indicating allowed emissions, according to some embodiments.

With a moderate calibration but not the perfect matching, FIG. 3 shows an example how the emission limit can be violated and results in need of extensive redesign or need to add common mode filter externally with a price of higher bill-of-materials (BoMs) cost. FIG. 3 shows emissions 301 from a transmitter front end as described above with respect to FIG. 2 and an emission limit line 310 indicating allowed emissions.

This disclosure provides a solution for detecting and canceling out or at least reducing this transmitter originated common mode signal 301 without significantly increasing the PHY complexity and power consumption.

The solution is not to calibrate the blocks that have mismatches, it rather uses a filter that compensates for the common mode signal while still living with the inherent mismatch among the blocks. This added value eventually saves front-end design complexity for calibration so there is no need to over-specify the blocks for close to zero mismatch.

The novel concept that is presented below with respect to FIGS. 4 to 9 provides common mode signal compensation through detecting and adaptively filtering this common mode signal.

Figure 4:
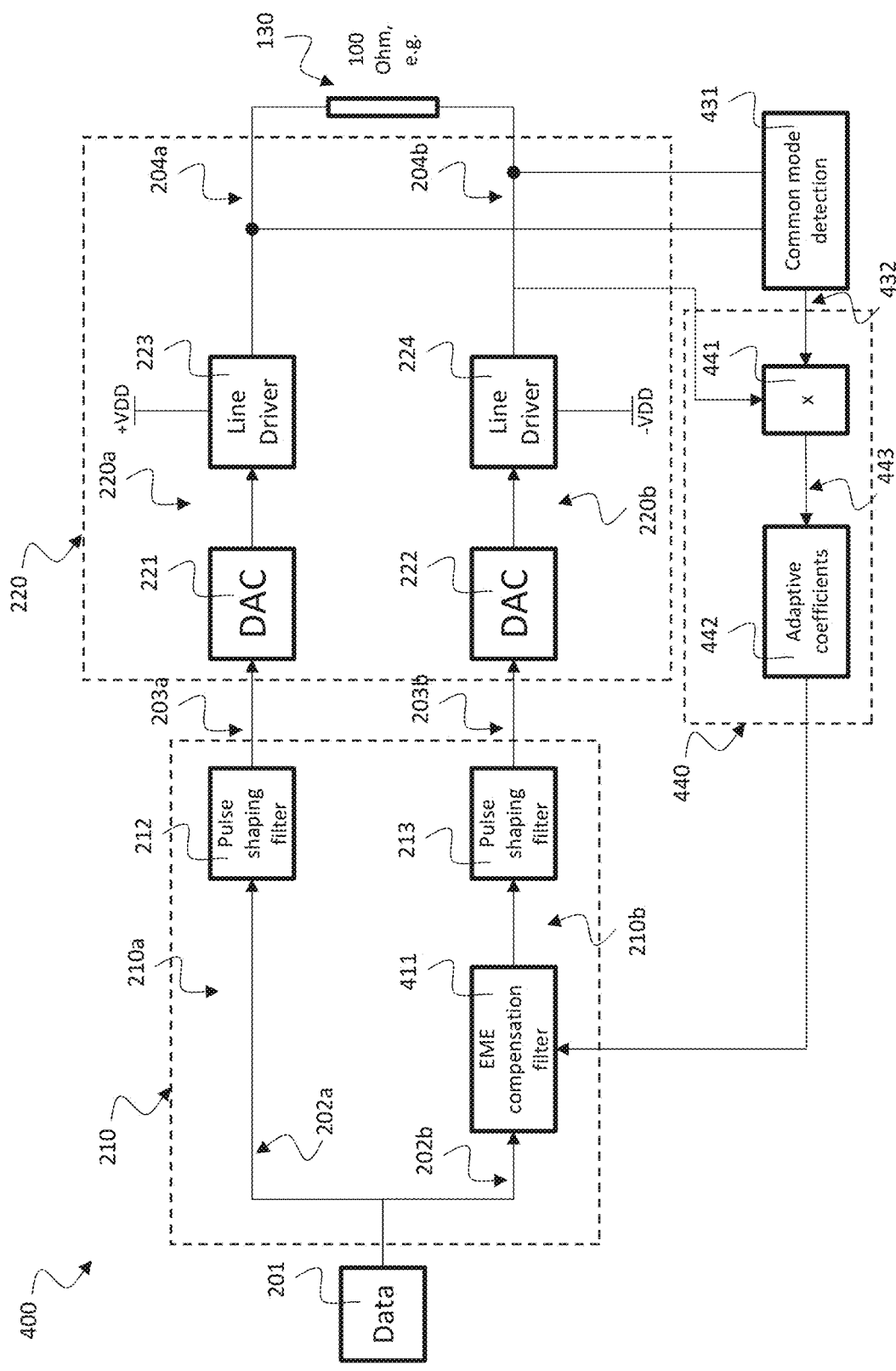
FIG. 4 shows a block diagram illustrating an apparatus 400 for reduction of transmitter originated common mode signal in a wired data communication link according to a first embodiment.

FIG. 4 shows a block diagram illustrating an apparatus 400 for reduction of transmitter originated common mode signal in a wired data communication link according to a first embodiment.

In particular, FIG. 4 shows an adaptive solution that instead constantly detecting the common mode signal, learns through the adaptive learning algorithm such as a least mean squares (LMS), and finally compensates the common mode signal using a filter so called electromagnetic emission (EME) compensation filter 411. This filter produces an output using the adaptive coefficients based on LMS learning. The common mode compensation can be performed in only one branch to make sure that the closed loop stays stable. Details of this solution are described in the following.

The apparatus 400 shown in FIG. 4 can be used for reduction of transmitter originated common mode signal in a wired data communication link 130 where common mode signal is forming a source of electromagnetic radiation as illustrated in FIG. 1.

The apparatus 400 comprises a digital front-end 210 configured to generate a differential transmit signal 202a, 202b based on transmit data 201. The digital front-end 210 is further configured to pulse-shape the differential transmit signal 202a, 202b by a pulse-shaping filter 212, 213 to obtain a pulse-shaped differential transmit signal 203a, 203b. The digital front-end 210 comprises a compensation filter 411 configured to filter the differential transmit signal 202a, 202b in order to reduce a common mode signal distortion.

The apparatus 400 comprises an analog front-end 220 configured to convert the pulse-shaped differential transmit signal 203a, 203b into an analog signal 204a, 204b representing the pulse-shaped differential transmit signal 203a, 203b for transmission over the wired data communication link 130.

The apparatus 400 comprises a common mode signal detector 431 configured to detect a common mode signal 432 in the analog signal 204a, 204b.

The apparatus 400 comprises a filter coefficient determiner 440 configured to determine filter coefficients 442 of the compensation filter 411 based on the detected common mode signal 432 for common mode signal reduction, and to provide the filter coefficients 442 to the compensation filter 411.

The determined filter coefficients 442 can be adaptive filter coefficients for adjusting the compensation filter 411, the filter coefficient determiner 440 may be configured to determine the filter coefficients 442 based on a least squares scheme for minimizing the detected common mode signal 432, e.g., using the LMS algorithm or a normalized LMS (NLMS) algorithm.

The filter coefficient determiner 440 may comprise a signal correlator 441 configured to correlate the detected common mode signal 432 with the analog signal 204a, 204b to obtain a correlated common mode signal 443 and to determine the filter coefficients 442 based on the correlated common mode signal 443.

The digital front-end 210 may comprise a first branch 210a to process a first signal component 202a of the differential transmit signal 202a, 202b and a second branch 210b to process a second signal component 202b of the differential transmit signal 202a, 202b. The first signal component 202a and the second signal component 202b of the differential transmit signal 202a, 202b are configured or designed as signals of equal magnitude and opposite polarity. However, as described above, deviations from the optimal design result in common signal components.

Figure 5:
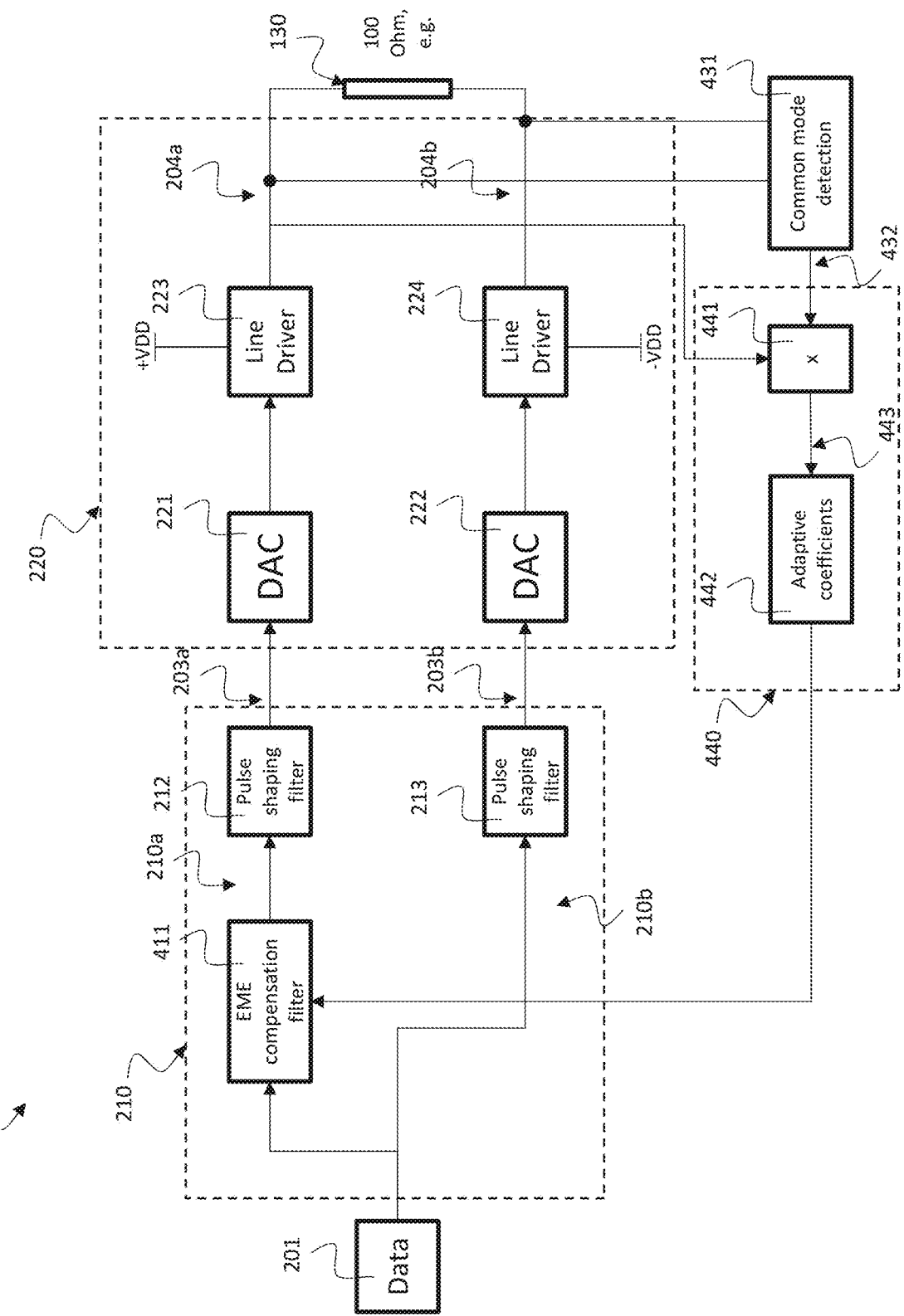
FIG. 5 shows a block diagram illustrating an apparatus 500 for reduction of transmitter originated common mode signal in a wired data communication link according to a second embodiment.

The compensation filter 411 may be arranged in the second branch 210b of the digital front-end 210 as shown in FIG. 4; or in the first branch 210a of the digital front-end 210 as shown in FIG. 5. Alternatively, two compensation filters 411 may be used (not shown in the Figures), each one arranged in a respective branch 210a, 210b.

The pulse-shaping filter 212, 213 may be arranged in both, the first branch 210a and the second branch 210b of the digital front-end 210 as shown in FIG. 4.

Figure 7:
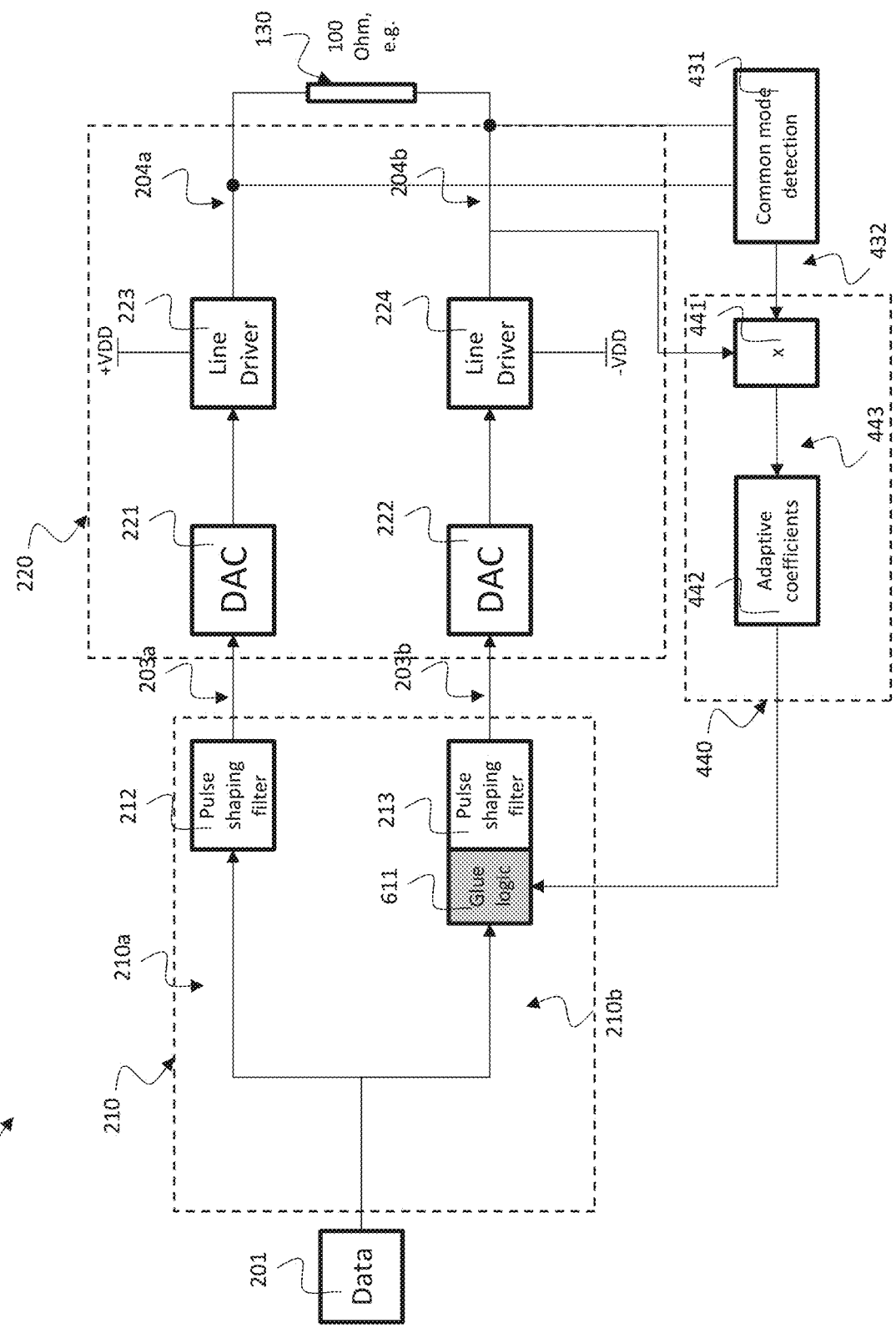
FIG. 7 shows a block diagram illustrating an apparatus 700 for reduction of transmitter originated common mode signal in a wired data communication link according to a fourth embodiment.

As shown in FIG. 4, the compensation filter 411 and the pulse shaping filter 213 are arranged in the second branch 210b of the digital front-end 210. In this implementation, these filters 411, 213 can be separate filter circuits as shown in FIG. 4 or can be implemented as a common filter circuit as shown in FIG. 7.

Figure 6:
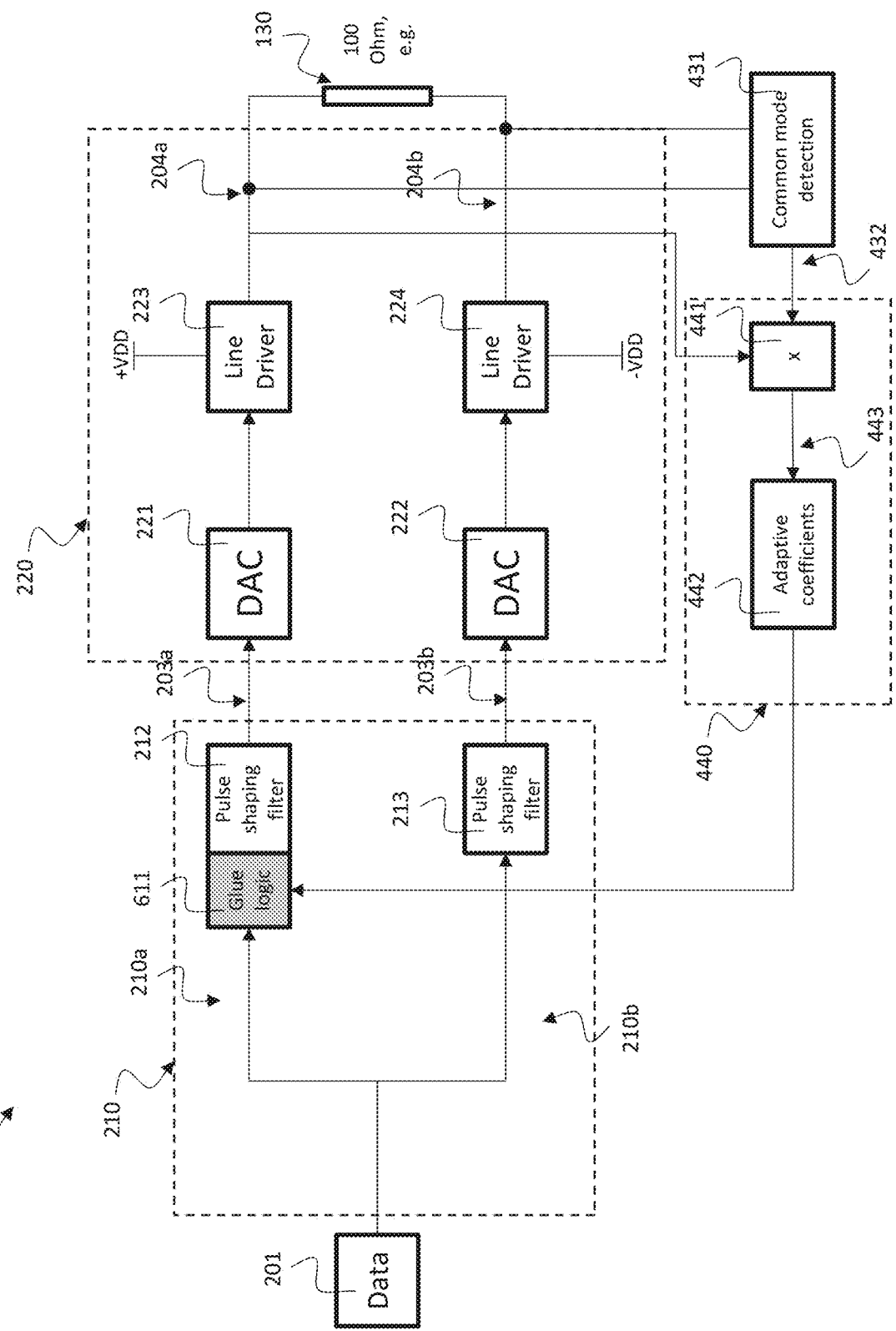
FIG. 6 shows a block diagram illustrating an apparatus 600 for reduction of transmitter originated common mode signal in a wired data communication link according to a third embodiment.

The pulse shaping filter 212, 213 may comprise fixed filter coefficients and the compensation filter 411 may comprise adaptive filter coefficients. The common filter circuit may comprise a glue logic 611 as shown in FIGS. 6 and 7 that may be configured to adjust at least part of the common filter circuit based on a combination of a fixed filter coefficient with an adaptive filter coefficient.

The analog front-end 220 may comprise a first branch 220a configured to process a first signal component 203a of the pulse-shaped differential transmit signal 203a, 203b and a second branch 220b configured to process a second signal component 203b of the pulse-shaped differential transmit signal 203a, 203b. The first signal component 203a and the second signal component 203b of the pulse-shaped differential transmit signal 203a, 203b may be configured or designed as signals of equal magnitude and opposite polarity. However, as described above, deviations from the optimal design result in common signal components.

The analog front-end 220 may comprise a first digital-to-analog converter 221 and a first line driver 223 which are configured to determine a first signal component 204a of the analog signal 204a, 204b. The analog front-end 220 may comprise a second digital-to-analog converter 222 and a second line driver 224 which are configured to determine a second signal component 204b of the analog signal 204a, 204b.

The common mode signal detector 431 may be configured to detect the common mode signal 432 based on the first signal component 204a of the analog signal 204a, 204b and the second signal component 204b of the analog signal 204a, 204b.

In one implementation, the first signal component 204a may be a first voltage V1 and the second signal component 204b may be a second voltage V2. The common mode signal detector 431 may add both voltages and divide them by 2 to result in a common mode signal (V1+V2)/2. The common mode signal detector 431 may apply a voltage threshold to this common mode signal to detect a common mode signal of sufficient power for further processing. The correlator 441 may multiply this common mode signal by the second voltage V2 to provide a correlated common mode signal 443 of V2*(V1+V2)/2. Alternatively, the threshold detection may be applied to this correlated common mode signal 443.

The filter coefficient determiner 440 may be configured to determine the filter coefficients 442 of the compensation filter 411 based on a correlation of the detected common mode signal 432 with: the first signal component 204a of the analog signal 204a, 204b as shown in FIG. 5; or the second signal component 204b of the analog signal 204a, 204b as shown in FIG. 4.

For a compensation filter 411 arranged in the first branch 210a of the digital front-end 210 as shown in FIG. 5, the filter coefficients 442 of the compensation filter 411 may be determined based on a correlation of the detected common mode signal 432 with the first signal component 204a of the analog signal 204a, 204b.

For a compensation filter 411 arranged in the second branch 210b of the digital front-end 210 as shown in FIG. 4, the filter coefficients 442 of the compensation filter 411 may be determined based on a correlation of the detected common mode signal 432 with the second signal component 204b of the analog signal 204a, 204b.

The compensation filter 411 may comprise a finite impulse response filter.

FIG. 5 shows a block diagram illustrating an apparatus 500 for reduction of transmitter originated common mode signal in a wired data communication link according to a second embodiment.

FIG. 5 shows the same solution as shown in FIG. 4, however, with different implementation, where the common mode signal compensation is done for the blocks in the branch that is connected to +VDD supply. Further the correlation is carried out between the detected common mode signal and line driver output that is also connected with the +VDD supply. The remaining blocks and their functionality are similar to the solution presented above with respect to FIG. 4.

I.e., the apparatus 500 shown in FIG. 5 comprises a digital front-end 210 configured to generate a differential transmit signal 202a, 202b based on transmit data 201. The digital front-end 210 is further configured to pulse-shape the differential transmit signal 202a, 202b by a pulse-shaping filter 212, 213 to obtain a pulse-shaped differential transmit signal 203a, 203b. The digital front-end 210 comprises a compensation filter 411 configured to filter the differential transmit signal 202a, 202b in order to reduce a common mode signal distortion.

The apparatus 500 further comprises an analog front-end 220 configured to convert the pulse-shaped differential transmit signal 203a, 203b into an analog signal 204a, 204b representing the pulse-shaped differential transmit signal 203a, 203b for transmission over the wired data communication link 130.

The apparatus 500 comprises a common mode signal detector 431 configured to detect a common mode signal 432 in the analog signal 204a, 204b.

The apparatus 500 comprises a filter coefficient determiner 440 configured to determine filter coefficients 442 of the compensation filter 411 based on the detected common mode signal 432 for common mode signal reduction, and to provide the filter coefficients 442 to the compensation filter 411.

The compensation filter 411 is arranged in the first branch 210a of the digital front-end 210. The pulse-shaping filter 212, 213 has two components, a first component 212 is arranged in the first branch 210a and a second component 213 is arranged in the second branch 210b of the digital front-end 210.

The compensation filter 411 and the first component 212 of the pulse shaping filter are arranged in the first branch 210a of the digital front-end 210. In this implementation, these filters 411, 213 can be separate filter circuits as shown in FIG. 5 or can be implemented as a common filter circuit as shown in FIG. 6.

The filter coefficient determiner 440 may be configured to determine the filter coefficients 442 of the compensation filter 411 based on a correlation of the detected common mode signal 432 with the first signal component 204a of the analog signal 204a, 204b as shown in FIG. 5.

For a compensation filter 411 arranged in the first branch 210a of the digital front-end 210 as shown in FIG. 5, the filter coefficients 442 of the compensation filter 411 may be determined based on a correlation of the detected common mode signal 432 with the first signal component 204a of the analog signal 204a, 204b.

FIG. 6 shows a block diagram illustrating an apparatus 600 for reduction of transmitter originated common mode signal in a wired data communication link according to a third embodiment and FIG. 7 shows a block diagram illustrating an apparatus 700 for reduction of transmitter originated common mode signal in a wired data communication link according to a fourth embodiment.

FIGS. 6 and 7 depict another alternative to implement the same solution, which uses a glue logic 611 that is glued with the pulse shaping filter 212, 213. In that way one filter can be used instead of implementing both filters separately as shown in FIGS. 4 and 5. However, the details of the compensation of common mode signal and updating the adaptive coefficients are similar to the solutions explained above with respect to FIGS. 4 and 5.

That means, the apparatus 600, 700 shown in FIGS. 6 and 7 comprises a digital front-end 210 configured to generate a differential transmit signal 202a, 202b based on transmit data 201. The digital front-end 210 is further configured to pulse-shape the differential transmit signal 202a, 202b by a pulse-shaping filter 212, 213 to obtain a pulse-shaped differential transmit signal 203a, 203b. The digital front-end 210 comprises a compensation filter, also referred herein as glue logic 611, configured to filter the differential transmit signal 202a, 202b in order to reduce a common mode signal distortion. This glue logic 611 has the same functionality as described above for the compensation filter 411 with respect to FIGS. 4 and 5.

The apparatus 600, 700 further comprises an analog front-end 220 configured to convert the pulse-shaped differential transmit signal 203a, 203b into an analog signal 204a, 204b representing the pulse-shaped differential transmit signal 203a, 203b for transmission over the wired data communication link 130.

The apparatus 600, 700 comprises a common mode signal detector 431 configured to detect a common mode signal 432 in the analog signal 204a, 204b.

The apparatus 600, 700 comprises a filter coefficient determiner 440 configured to determine filter coefficients 442 of the compensation filter, i.e., glue logic 611 based on the detected common mode signal 432 for common mode signal reduction, and to provide the filter coefficients 442 to the compensation filter, i.e. glue logic 611.

As shown in FIGS. 6 and 7, the compensation filter, i.e., glue logic 611 and the pulse shaping filter 213 are arranged in the first branch 210a (FIG. 6) or in the second branch 210b (FIG. 7) of the digital front-end 210. In the implementation shown in FIGS. 6 and 7, these filters 611, 213 are implemented as a common filter circuit.

The pulse shaping filter 212, 213 may comprise fixed filter coefficients and the compensation filter, i.e., glue logic 611 may comprise adaptive filter coefficients. The common filter circuit may comprise the glue logic 611 that may be configured to adjust at least part of the common filter circuit based on a combination of a fixed filter coefficient with an adaptive filter coefficient.

Figure 8:
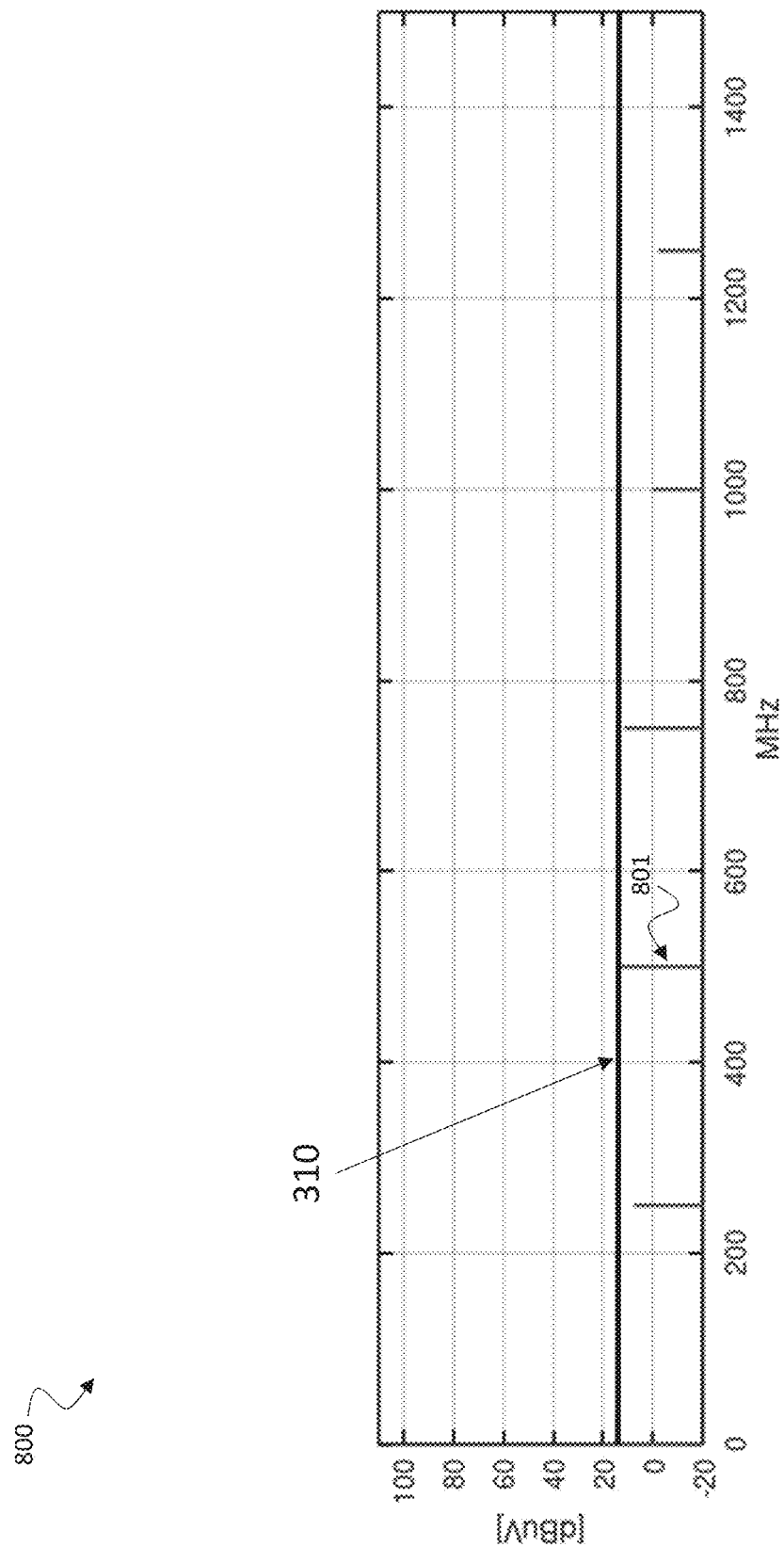
FIG. 8 shows a performance diagram 800 illustrating emissions 801 from an apparatus according to some embodiments that applies reduction of transmitter originated common mode signal as shown in FIGS. 4 to 7 and the same emission limit line 310 shown in FIG. 3.

FIG. 8 shows a performance diagram 800 illustrating emissions 801 from an apparatus according to the disclosure that applies reduction of transmitter originated common mode signal as shown in FIGS. 4 to 7 and the same emission limit line 310 shown in FIG. 3.

FIG. 8 shows the effect of the common mode signal reduction according to the implementation of FIGS. 4 to 7. The emission limit 310 is no longer violated. Emissions 801 from a transmitter front end as described above with respect to FIGS. 4 to 7 are below the emission limit line 310 indicating allowed emissions.

Figure 9:
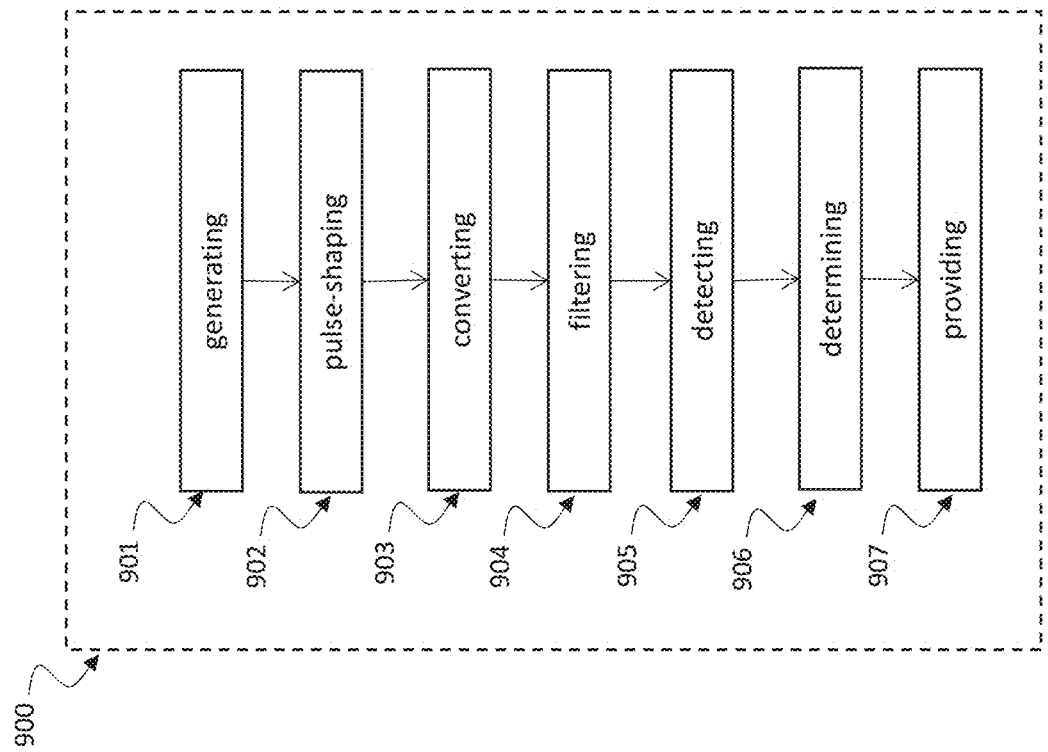
FIG. 9 shows a schematic diagram of a method 900 for reduction of transmitter originated common mode signal in a wired data communication link according to some embodiments.

FIG. 9 shows a schematic diagram of a method 900 for reduction of transmitter originated common mode signal in a wired data communication link according to the disclosure.

The method 900 comprises generating 901 a differential transmit signal 202a, 202b based on transmit data 201, e.g., as described with respect to FIG. 4.

The method 900 comprises pulse-shaping 902 the differential transmit signal 202a, 202b by a pulse-shaping filter 212, 213 to obtain a pulse-shaped differential transmit signal 203a, 203b, e.g., as described with respect to FIG. 4.

The method 900 comprises converting 903 the pulse-shaped differential transmit signal 203a, 203b into an analog signal 204a, 204b representing the pulse-shaped differential transmit signal 203a, 203b for transmission over the wired data communication link 130, e.g., as described with respect to FIG. 4.

The method 900 comprises filtering 904 the differential transmit signal 202a, 202b by a compensation filter 411 in order to reduce a common mode signal distortion, e.g., as described with respect to FIG. 4.

The method 900 comprises detecting 905 a common mode signal 432 in the analog signal 204a, 204b, e.g., as described with respect to FIG. 4.

The method 900 comprises determining 906 filter coefficients of the compensation filter 411 based on the detected common mode signal 432 for common mode signal reduction, e.g., as described with respect to FIG. 4.

The method 900 comprises providing 907 the filter coefficients to the compensation filter 411, e.g., as described with respect to FIG. 4.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other, regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiments of the disclosure beyond those described herein. While the present disclosure has been described with reference to one or more particular embodiments, those skilled in the art recognize that many changes may be made thereto without departing from the scope of the present disclosure.

What is claimed is:

1. An apparatus for reduction of transmitter originated common mode signal in a wired data communication link, the common mode signal forming a source of electromagnetic radiation, the apparatus comprising:

a digital front-end configured to generate a differential transmit signal based on transmit data, and pulse-shape the differential transmit signal by a pulse-shaping filter to obtain a pulse-shaped differential transmit signal, wherein the digital front-end comprises a compensation filter configured to filter the differential transmit signal in order to reduce a common mode signal distortion;

an analog front-end configured to convert the pulse-shaped differential transmit signal into an analog signal representing the pulse-shaped differential transmit signal for transmission over the wired data communication link;

a common mode signal detector configured to detect the common mode signal in the analog signal; and a filter coefficient determiner configured to determine filter coefficients of the compensation filter based on the detected common mode signal for common mode signal reduction, and provide the filter coefficients to the compensation filter.

2. The apparatus of claim 1, wherein the determined filter coefficients are adaptive filter coefficients for adjusting the compensation filter, and wherein the filter coefficient determiner is configured to determine the filter coefficients based on a least squares scheme for minimizing the detected common mode signal.

3. The apparatus of claim 1, wherein the filter coefficient determiner comprises a signal correlator configured to correlate the detected common mode signal with the analog signal to obtain a correlated common mode signal, and wherein the filter coefficient determiner is configured to determine the filter coefficients based on the correlated common mode signal.

4. The apparatus of claim 1, wherein the digital front-end comprises a first branch configured to process a first signal component of the differential transmit signal, and a second branch configured to process a second signal component of the differential transmit signal, and wherein the first signal component and the second signal component of the differential transmit signal are configured as signals of equal magnitude and opposite polarity.

5. The apparatus of claim 4, wherein the compensation filter is arranged:

in the first branch of the digital front-end; or in the second branch of the digital front-end.

6. The apparatus of claim 5, wherein the pulse-shaping filter is arranged in both the first branch and the second branch of the digital front-end.

7. The apparatus of claim 6, wherein the compensation filter is arranged in the first branch of the digital front-end, the compensation filter and the pulse shaping filter are separate filter circuits or a common filter circuit; or wherein the compensation filter is arranged in the second branch of the digital front-end, the compensation filter and the pulse shaping filter are the separate filter circuits or the common filter circuit.

8. The apparatus of claim 7, wherein the pulse shaping filter and the compensation filter are the separate filter circuits, the pulse shaping filter comprises fixed filter coefficients and the compensation filter comprises adaptive filter coefficients, or wherein the pulse shaping filter and the compensation filter are the common filter circuit, the common filter circuit comprises a glue logic configured to adjust at least part of the common filter circuit based on a combination of a fixed filter coefficient with an adaptive filter coefficient.

9. The apparatus of claim 1,
wherein the analog front-end comprises a first branch configured to process a first signal component of the pulse-shaped differential transmit signal, and a second branch configured to process a second signal component of the pulse-shaped differential transmit signal, and
wherein the first signal component and the second signal component of the pulse-shaped differential transmit signal are configured as signals of equal magnitude and opposite polarity.

10. The apparatus of claim 1, wherein the analog front-end comprises:
a first digital-to-analog converter and a first line driver configured to determine a first signal component of the analog signal; and
a second digital-to-analog converter and a second line driver configured to determine a second signal component of the analog signal.

11. The apparatus of claim 10,
wherein the common mode signal detector is configured to detect the common mode signal based on the first signal component of the analog signal and the second signal component of the analog signal.

12. The apparatus of claim 11, wherein the filter coefficient determiner is configured to determine the filter coefficients of the compensation filter based on a correlation of the detected common mode signal with:
the first signal component of the analog signal; or
the second signal component of the analog signal.

13. The apparatus of claim 12,
wherein the compensation filter is arranged in the first branch of the digital front-end, the filter coefficients of the compensation filter are determined based on the correlation of the detected common mode signal with the first signal component of the analog signal; or
wherein the compensation filter is arranged in the second branch of the digital front-end, the filter coefficients of the compensation filter are determined based on the correlation of the detected common mode signal with the second signal component of the analog signal.

14. The apparatus of claim 1,
wherein the compensation filter comprises a finite impulse response filter.

15. A method for reduction of transmitter originated common mode signal in a wired data communication link, the common mode signal forming a source of electromagnetic radiation, the method comprising:
generating a differential transmit signal based on transmit data;
pulse-shaping the differential transmit signal by a pulse-shaping filter to obtain a pulse-shaped differential transmit signal;
converting the pulse-shaped differential transmit signal into an analog signal representing the pulse-shaped differential transmit signal for transmission over the wired data communication link;
filtering the differential transmit signal by a compensation filter in order to reduce a common mode signal distortion;
detecting the common mode signal in the analog signal;
determining filter coefficients of the compensation filter based on the detected common mode signal for common mode signal reduction; and
providing the filter coefficients to the compensation filter.

* * * * *